United States Patent
Clapie et al.

(10) Patent No.: US 9,114,837 B2
(45) Date of Patent: Aug. 25, 2015

(54) FORCE-DEFLECTING COMPONENT FOR A MOTOR VEHICLE FOR PROTECTING AGAINST AN IMPACT OF A CURB EDGE AGAINST AN UNDERSIDE OF THE MOTOR VEHICLE

(75) Inventors: Yann Clapie, Stammham (DE); Daniel Eichlinger, Hepberg (DE)

(73) Assignee: Faurecia Exteriors GmbH, Stadthagen (DE)

( * ) Notice: Subject to any disclaimer, the term of this patent is extended or adjusted under 35 U.S.C. 154(b) by 0 days.

(21) Appl. No.: 14/003,603

(22) PCT Filed: Mar. 7, 2012

(86) PCT No.: PCT/EP2012/053947
§ 371 (c)(1),
(2), (4) Date: Sep. 27, 2013

(87) PCT Pub. No.: WO2012/120061
PCT Pub. Date: Sep. 13, 2012

(65) Prior Publication Data
US 2014/0015281 A1    Jan. 16, 2014

(30) Foreign Application Priority Data
Mar. 7, 2011    (DE) .......................... 10 2011 013 269

(51) Int. Cl.
B62D 21/15    (2006.01)
B60R 19/54    (2006.01)
B60R 19/34    (2006.01)
B62D 25/08    (2006.01)

(52) U.S. Cl.
CPC ............... *B62D 21/15* (2013.01); *B60R 19/54* (2013.01); *B62D 21/152* (2013.01); *B60R 19/34* (2013.01); *B62D 25/085* (2013.01)

(58) Field of Classification Search
CPC ....................................................... B62D 21/15
USPC ........ 293/117, 132, 120; 296/187.08, 193.09, 296/180.2
See application file for complete search history.

(56) References Cited

U.S. PATENT DOCUMENTS

| 6,089,628 | A | 7/2000 | Schuster |
| 6,663,151 | B2 * | 12/2003 | Mansoor et al. ............... 293/120 |
| 7,434,872 | B2 * | 10/2008 | Steller ...................... 296/193.09 |
| 7,578,541 | B2 | 8/2009 | Layfield et al. |

FOREIGN PATENT DOCUMENTS

| CN | 1319522 A | 10/2001 |
| CN | 101022978 A | 8/2007 |

(Continued)

*Primary Examiner* — Joseph D Pape
*Assistant Examiner* — Dana Ivey
(74) *Attorney, Agent, or Firm* — Thompson Coburn LLP

(57) ABSTRACT

A force deflecting component (100) for a motor vehicle for protecting an underside of the motor vehicle against an impact of a curb edge, wherein the force-deflecting component (100) is configured to be arranged on a motor vehicle longitudinal member (102) on the underside of the motor vehicle in the vertical direction of the motor vehicle and connected in the longitudinal direction of the motor vehicle by a support (104) connected to the body of the motor vehicle, wherein the force-deflecting component (100) comprises an impact surface (112) and is elastically deformable in the vertical direction of the motor vehicle to completely absorb forces acting on the impact surface (112) in the event of a sudden movement of the motor vehicle in the direction of the curb edge caused by a curb departure of the motor vehicle.

18 Claims, 3 Drawing Sheets

(56) References Cited

FOREIGN PATENT DOCUMENTS

Figure 1:
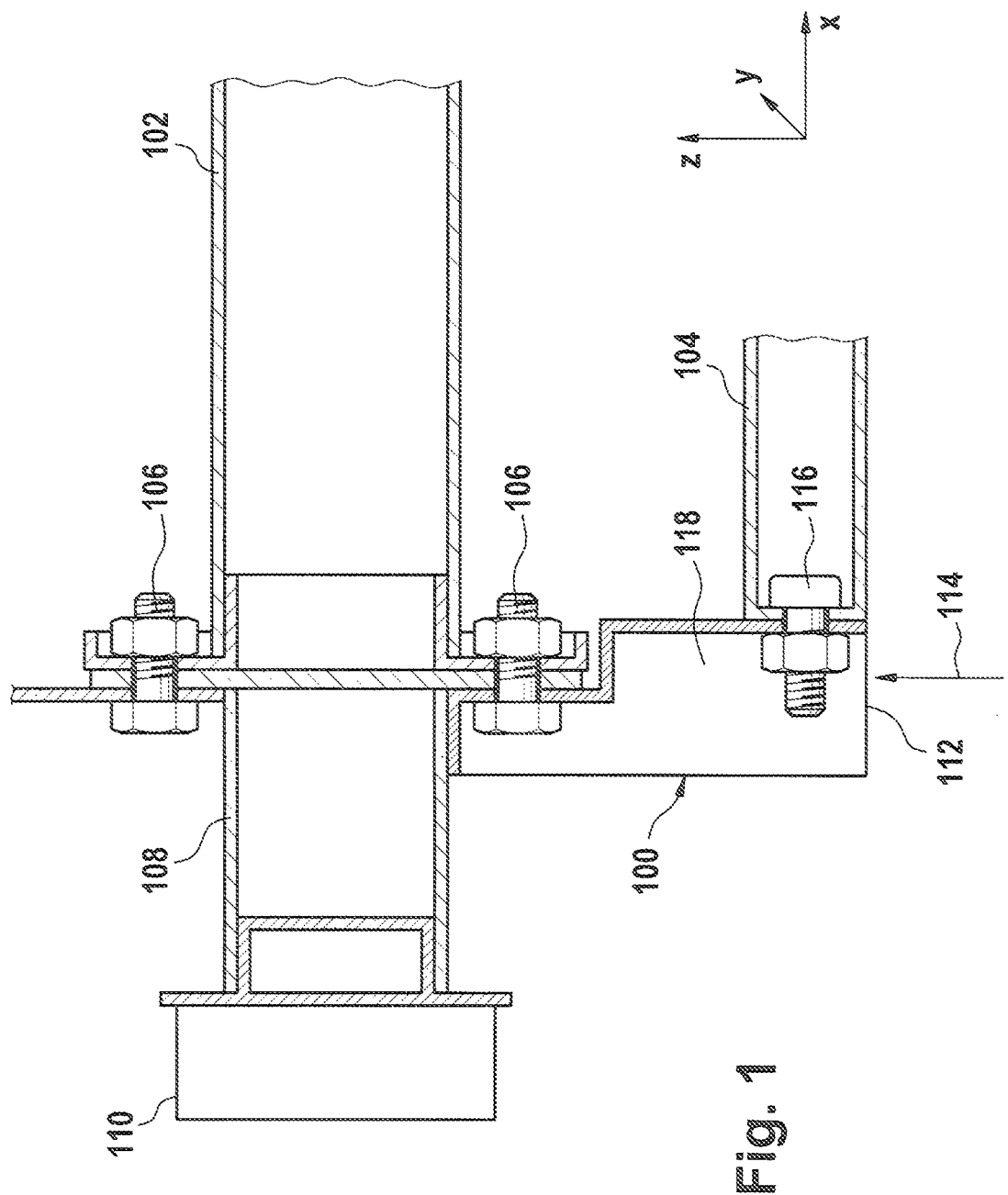

| | | | |
|---|---|---|---|
| DE | 19835527 | A1 | 2/2000 |
| FR | 2930755 | A3 | 11/2009 |
| FR | 2952017 | A1 | 5/2011 |
| JP | 2009056857 | A | 3/2009 |

\* cited by examiner

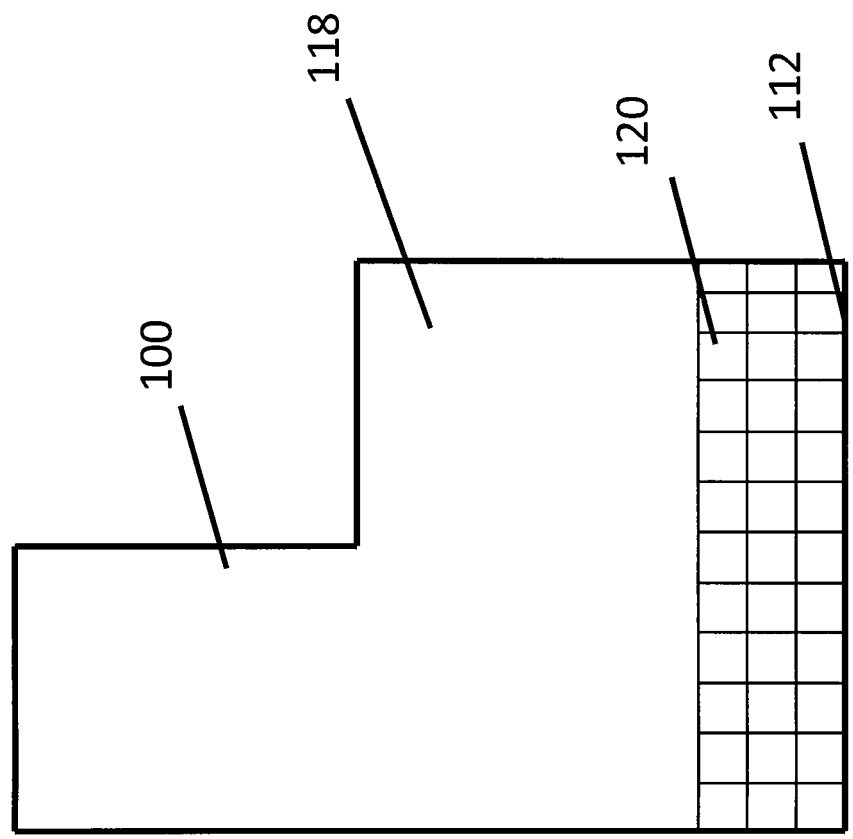
Fig. 2
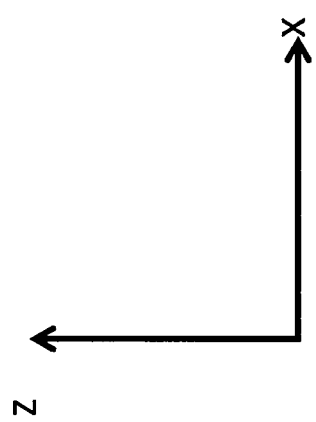

FORCE-DEFLECTING COMPONENT FOR A MOTOR VEHICLE FOR PROTECTING AGAINST AN IMPACT OF A CURB EDGE AGAINST AN UNDERSIDE OF THE MOTOR VEHICLE

CROSS-REFERENCE TO RELATED APPLICATIONS

This application is a National Stage application of International Patent Application No. PCT/EP20121053947, filed on Mar. 7, 2012, which is incorporated by reference herein in its entirety, which claims the benefit of German Application No. 10 2011 013 269.4 filed Mar. 7, 2011, which is incorporated by reference herein in its entirety.

In the event of a "curb departure" of a motor vehicle, the front wheels, for example, leave the curb edge, to "fall" then suddenly downward on the asphalt. Due to the usual suspension of the motor vehicle, as a result, the body of the motor vehicle will initially make a certain jerky movement in the direction of the curb edge. Subsequently, the suspension brings the body back to its rest position.

Due to the jerky movement in the direction of the curb edge the danger exists that the underside of the motor vehicle briefly impacts on the curb edge, since the distance between the curb side and the underside at the moment of the jerky movement is less than in the rest position.

In order to avoid damages to the underside of the motor vehicle in the case of the "curb departure," the impact forces occurring in the process are channeled via special steel- or aluminum mountings into the longitudinal members of the motor vehicle. However, this requires a high cost of materials on the part of these mountings.

The invention addresses the problem of creating an improved force-deflecting component for motor vehicle for protecting against an impact of a curb edge against an underside of the motor vehicle, as well as a motor vehicle.

The problems addressed by the invention are solved by the features of the independent patent claims. The preferred embodiments of the invention are indicated in the dependent patent claims.

The invention relates to a force-deflecting component for a motor vehicle for protecting against an impact of a curb edge against an underside of the motor vehicle, wherein the component can be arranged on a motor vehicle longitudinal member on the underside of the motor vehicle in the vertical direction of the motor vehicle and can be connected in the longitudinal direction of the motor vehicle by a support connected to the body of the motor vehicle, wherein the force-deflecting component is designed to provide an impact surface and to completely absorb forces acting on the impact surface in the event of a jerky movement of the curb edge in the direction of the underside of the motor vehicle.

Embodiments of the invention could have the advantage, that damage to the underside of the motor vehicle in the case of a "curb departure" is avoided. By using the force-deflecting component any impact forces acting on the underside of the motor vehicle are completely absorbed—unwanted damage to other structural components of the motor vehicle is avoided. Since the force-deflecting component is connected both with the motor vehicle longitudinal member as well as with the support, an optimal mechanical stability is ensured. The support prevents a "buckling" or "snapping" of the force-deflecting component upon contact with the curb edge in the longitudinal direction of the motor vehicle. Due to its extremely high mechanical stiffness and stability the motor vehicle longitudinal member is the optimal point of application, in order to give the force-deflecting component a high mechanical stability in the vertical direction and motor vehicle transverse direction.

According to an embodiment of the invention the component is elastically deformable. Therefore, on the one hand, the forces acting during impact can be cushioned in their reception, instead of being passed on directly to the body. On the other hand, this makes it possible that no permanent damages result from the curb departure. Preferably the deformation of the force-deflecting component is completely reversible again after completion of the curb departure. Any permanent damages are avoided.

According to an embodiment of the invention the impact surface has a meandering surface. Thus, an overall very high surface cross-section of the impact surface can be provided, whereby the forces acting during the impact can be extensively absorbed and be distributed via the force-deflecting component. Overall, the cost of materials of the force-deflecting component is thus minimized while maximizing its mechanical stability.

According to an embodiment of the invention the component is container-shaped, wherein the container has a ribbed structure at least in the area of the impact surface for force deflection. With this a saving in the weight of the force-deflecting component is possible overall, however, without having to forego a high total stability.

It should be noted at this point that preferably the force-deflecting component can be produced by using an injection molding process for reasons of cost. In this case, it would be impossible, due to the container-shaped and therefore closed form of the force-deflecting component to provide a closed impact surface. The meandering surface form, on the other hand, permits the combination of production in the injection molding process with a closed container form and guarantee of an optimal possibility for force absorption of the force-deflecting component.

According to an embodiment of the invention the mounting support and/or force-deflecting component is composed of plastic.

According to an embodiment of the invention the component is part of a mounting support of the motor vehicle. Either the component and the mounting support are formed in one piece or else the component and the mounting support constitute two elements, wherein the force-deflecting component can be fastened to the mounting support via fastening means.

In another aspect, the invention relates to a motor vehicle with an above-described force-deflecting component.

The preferred embodiment of the invention is described in detail below by means of the drawing FIGS. 1 to 3.

FIG. 1 shows a side view in the x-z direction of a motor vehicle with a motor vehicle longitudinal member 102. The member 102 runs in the x direction. In the framework of the present invention the motor vehicle vertical direction is understood to be the z direction of the motor vehicle, the motor vehicle transversal direction is understood to be the y-direction, and the motor vehicle longitudinal direction is understood to be the x direction.

Furthermore, a crashbox 108 is arranged on the motor vehicle longitudinal member 102, which can absorb forces acting in the event of a crash particularly in the x direction. A bending beam 110 of the motor vehicle is also evident.

A mounting support 100 is fastened on the motor vehicle longitudinal member 102, for example, by means of a screw connection 106. The mounting support serves as a structural component of the motor vehicle, in order to keep, for example, the mudguard and the longitudinal member 100 together in the event of a crash. The mounting support 100 also serves as an attachment part to accommodate other components of the motor vehicle such as headlights or locks.

The mounting support 100 is firmly connected with its end turned away from the longitudinal member 102 to a support 104. The support 104 is in turn mounted on the body of the motor vehicle and serves to absorb the forces acting on the mounting support 100 in the x direction and to prevent movement of the mounting support 100 in the x direction. Nonetheless, the support 104 can make a movement in the z direction, if the underside and surface 112 of the mounting support 100 experiences a movement in the direction 114.

The movement in the direction 114 can be the result of a curb departure of the motor vehicle. In this case, a curb edge hits against the surface 112. Since the mounting support 100 is elastically deformable at least in its area facing the surface 112, the surface 112 will experience a movement in the direction 114. Due to the coupling of the mounting support 100 with the support 104 via the fastening means 116 and the mobility of the support 104 in direction 114 the support 104 also is moved in direction 114. Nonetheless, when landing on the curb edge the mounting support 100 cannot bend away or get out of the way in x direction due to the support 104. Therefore, even in the case of the curb departure a high stability of the underside of the motor vehicle is given.

It should be noted at this point that the surface 112 can be formed as one piece with the mounting support 100. In this case, the surface 112 is part of a force-deflecting component, which in turn is itself a part or section of the mounting support 100.

Alternatively, the force-deflecting component can be a separate part, which is fixed to the mounting support. The mounting support 100 is always produced from plastic, which reduces the total weight of the motor vehicle. The fixation can occur in the case of the separate part, for example, by injection molding. It is also possible, that the mounting support 100 and the force-deflection component have two different plastic materials, wherein, for example, the material of the component with the surface 112 has an especially highly reversible deformability, whereas the mounting support 100 itself consists of a material with high hardness and bending stiffness.

In general, the production of the mounting support is possible in hybrid- or all-plastic technology.

In order to give the mounting support 100 with its surface 112 a high mechanical stability, the mounting support has a ribbed structure 120 for force deflection in its cavity 118 at least in the area of the surface 112 (cf. FIG. 2). The ribbed structure 120 is not evident in FIG. 1, however it runs preferably in all three dimensions within the mounting support 100.

Figure 3:
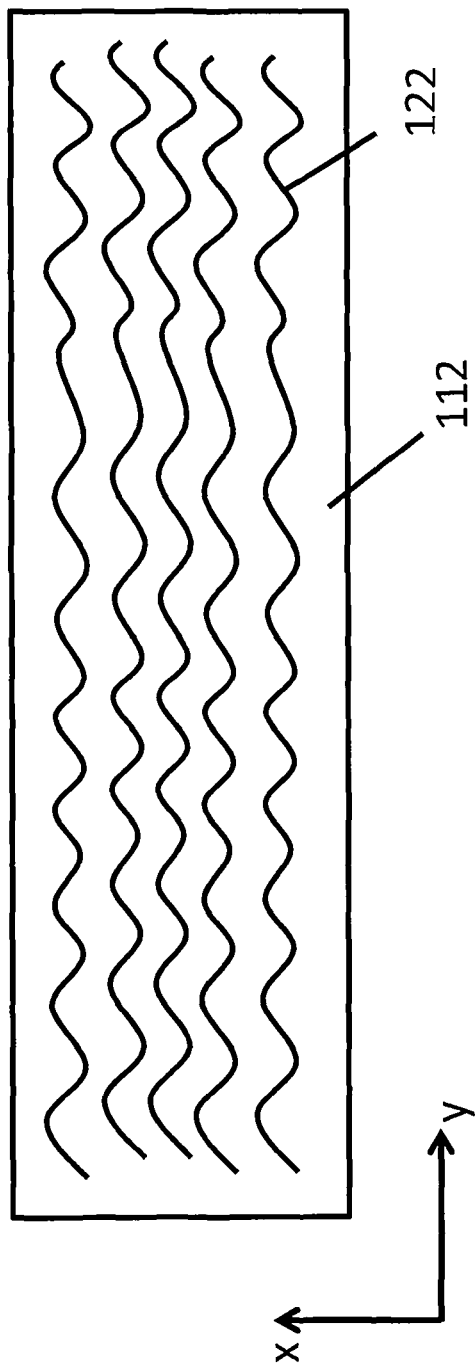

Furthermore, the surface 112 is not a continuous, closed surface, but rather the surface is meandering in the x-y plane, as shown in FIG. 3. Preferably the coils 122 of the meandering form run in the y direction, whereby an optimal elasticity behavior is ensured during the impact of the surface 112 on a curb edge. Overall, the meandering form of the surface 112 gives a high surface cross-section, so that through the "curb departure" of the motor vehicle forces acting on the surface 112 are absorbed optimally and completely by the mounting support 100. In the case of a two-part arrangement of the mounting support 100 with a force-deflecting component the forces acting on the surface 112 are completely absorbed by this force-deflecting component.

It should be noted, that as part of the entire description the arrangement of the surface 112 and therefore in general of the force-deflecting component is selected so that in the case of a curb departure the curb edge hits against the underside of the motor vehicle exclusively in the area of the surface 112. In the case of a facing of the underside this can also be an indirect hit of the curb edge on the surface 112 via the facing. That is, in the event of a jerky movement of the curb edge in the direction of the underside of the motor vehicle any contact of the curb edge with the motor vehicle takes place in the area of the force-deflecting component, which completely absorbs forces resulting therefrom and acting upon the impact surface.

REFERENCE SIGN LIST

100 Force-deflecting component
102 Longitudinal member
104 Support
106 Fastening means
108 Crashbox
110 Bending cross beam
112 impact surface
114 Direction
116 Fastening means
118 Cavity
120 ribbed structure
122 meandering coil

The invention claimed is:

1. A force-deflecting component (100) for a motor vehicle for protecting an underside of the motor vehicle against an impact of a curb edge, wherein the force-deflecting component (100):
   (a) is configured to be (i) arranged on a motor vehicle longitudinal member (102) on the underside of the motor vehicle in a vertical direction of the motor vehicle and (ii) connected in a longitudinal direction of the motor vehicle by a support (104) connected to a body of the motor vehicle; and
   (b) comprises an impact surface (112) and is elastically deformable in the vertical direction of the motor vehicle to completely absorb forces acting on the impact surface (112) in the event of a jerky movement of the motor vehicle in a direction of the curb edge caused by a curb departure of the motor vehicle.

2. A force-deflecting component (100) according to claim 1, wherein the impact surface (112) has a meandering-shaped surface.

3. A force-deflecting component (100) according to claim 2, wherein the force-deflecting component (100) has a shape of a container, wherein the container has a ribbed structure for the force deflection at least in the area of the impact surface (112).

4. A mounting support for a motor vehicle, said mounting support having a part formed by the force-deflecting component (100) according to claim 3.

5. The mounting support according to claim 4, wherein the force-deflecting component (100) and the mounting support are formed in one piece.

6. The mounting support according to claim 4, wherein the force-deflecting component (100) is fixed on the mounting support via a fastening means.

7. A motor vehicle comprising a force-deflecting component (100), wherein the force-deflecting component (100):
   (a) is configured to be (i) arranged on a motor vehicle longitudinal member (102) on the underside of the motor vehicle in a vertical direction of the motor vehicle and (ii) connected in a longitudinal direction of the motor vehicle by a support (104) connected to a body of the motor vehicle; and
   (b) comprises an impact surface (112) and is elastically deformable in the vertical direction of the motor vehicle to completely absorb forces acting on the impact surface (112) in the event of a jerky movement of the motor vehicle in a direction of the curb edge caused by a curb departure of the motor vehicle.

8. The motor vehicle according to claim 7, wherein the impact surface (112) has a meandering-shaped surface.

9. The motor vehicle according to claim 8, wherein the force-deflecting component (100) has a shape of a container, wherein the container has a ribbed structure for the force deflection at least in the area of the impact surface (112).

10. The motor vehicle according to claim 9, wherein the force-deflecting component (100) is part of a mounting support of the motor vehicle.

11. The motor vehicle of claim 10, wherein the force-deflecting component (100) and the mounting support are formed in one piece.

12. The motor vehicle of claim 10, wherein the force-deflecting component (100) is fixed on the mounting support via a fastening means.

13. An arrangement comprising:
  (a) a support (104) configured to be connected to a body of a motor vehicle; and
  (b) a force-deflecting component (100) for protecting an underside of the motor vehicle against an impact of a curb edge, wherein the force-deflecting component (100):
    (i) is configured to be arranged on a motor vehicle longitudinal member (102) on the underside of the motor vehicle in a vertical direction of the motor vehicle and connected in a longitudinal direction of the motor vehicle to the support (104) to prevent a movement of the force-deflecting component (100) in the longitudinal direction of the motor vehicle; and
    (ii) comprises an impact surface (112) and is elastically deformable in the vertical direction of the motor vehicle to completely absorb forces acting on the impact surface (112) in the event of a jerky movement of the motor vehicle in a direction of the curb edge caused by a curb departure of the motor vehicle.

14. The arrangement according to claim 13, wherein the impact surface (112) has a meandering-shaped surface.

15. The arrangement according to claim 14, wherein the force-deflecting component (100) has a shape of a container, wherein the container has a ribbed structure for the force deflection at least in the area of the impact surface (112).

16. The arrangement according to claim 15, further comprising a mounting support of the motor vehicle, wherein the force-deflecting component (100) is part of said mounting support.

17. The arrangement of claim 16, wherein the force-deflecting component (100) and the mounting support are formed in one piece.

18. The arrangement of claim 16, wherein the force-deflecting component (100) is fixed on the mounting support via a fastening means.

* * * * *